（12） United States Patent
Sharma et al.

(10) Patent No.: US 9,131,338 B2
(45) Date of Patent: Sep. 8, 2015

(54) METHOD AND APPARATUS FOR PROVIDING AN ALERT ON A USER EQUIPMENT ENTERING AN ALERTING AREA

(71) Applicant: Samsung Electronics Co., Ltd., Gyeonggi-do (KR)

(72) Inventors: Kartika Sharma, Bangalore (IN); Ashish Dhiman, Bangalore (IN); Kirti Keshav, Bangalore (IN); Prattyush Banerjee, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 205 days.

(21) Appl. No.: 13/680,895

(22) Filed: Nov. 19, 2012

(65) Prior Publication Data

US 2013/0130718 A1 May 23, 2013

(30) Foreign Application Priority Data

Nov. 18, 2011 (IN) .......................... 3968/CHE/2011
Aug. 24, 2012 (KR) ....................... 10-2012-0093236

(51) Int. Cl.
  *H04W 4/02* (2009.01)
  *G01S 19/48* (2010.01)
  *G01S 5/02* (2010.01)
  *H04W 4/20* (2009.01)
  *H04W 64/00* (2009.01)

(52) U.S. Cl.
  CPC .............. *H04W 4/02* (2013.01); *G01S 5/0263* (2013.01); *G01S 19/48* (2013.01); *H04W 4/021* (2013.01); *H04W 4/023* (2013.01); *H04W 4/026* (2013.01); *H04W 4/027* (2013.01); *H04W 4/20* (2013.01); *H04W 64/006* (2013.01); *Y02B 60/50* (2013.01)

(58) Field of Classification Search
  CPC ......... H04W 4/02; G01S 19/48; G01S 5/0263
  USPC ...................................................... 455/456.3
  See application file for complete search history.

(56) References Cited

U.S. PATENT DOCUMENTS

| 6,957,076 | B2 | 10/2005 | Hunzinger | |
|---|---|---|---|---|
| 6,980,131 | B1 * | 12/2005 | Taylor | ............ 340/994 |
| 7,084,758 | B1 | 8/2006 | Cole | |
| 7,212,827 | B1 | 5/2007 | Veschl | |
| 7,305,244 | B2 | 12/2007 | Blomqvist et al. | |
| 7,409,233 | B2 * | 8/2008 | Pritchard | ....................... 455/567 |
| 8,036,679 | B1 * | 10/2011 | Barbeau et al. | ............ 455/456.1 |

(Continued)

FOREIGN PATENT DOCUMENTS

| EP | 1 771 024 | 4/2007 |
|---|---|---|
| WO | WO 03/024141 | 3/2003 |

(Continued)

*Primary Examiner* — Qun Shen
(74) *Attorney, Agent, or Firm* — The Farrell Law Firm, P.C.

(57) ABSTRACT

A method and apparatus for providing an alert on a portable communication device such as a user equipment (UE) entering an alerting area is provided. The UE runs a GPS engine continuously to estimate the location of the UE from the time the alert system is activated. The method and apparatus provide an alert system on a UE by calculating the distance between the UE and alerting area. Further, the method and apparatus enable using different positioning systems based on the distance of the UE from the alerting area, thereby reducing the power consumption of the UE battery.

18 Claims, 9 Drawing Sheets

(56) References Cited

U.S. PATENT DOCUMENTS

| | | | |
|---|---|---|---|
| 8,090,384 B2* | 1/2012 | Alles et al. | 455/456.1 |
| 8,589,069 B1* | 11/2013 | Lehman | 701/438 |
| 2004/0259566 A1* | 12/2004 | Maanoja et al. | 455/456.1 |
| 2007/0123265 A1* | 5/2007 | Moon | 455/449 |
| 2008/0176583 A1* | 7/2008 | Brachet et al. | 455/456.3 |
| 2008/0261622 A1* | 10/2008 | Lee et al. | 455/456.2 |
| 2010/0062752 A1* | 3/2010 | Shim | 455/418 |
| 2010/0135178 A1* | 6/2010 | Aggarwal et al. | 370/252 |
| 2010/0203902 A1 | 8/2010 | Wachter et al. | |

FOREIGN PATENT DOCUMENTS

| | | |
|---|---|---|
| WO | WO 2007/018408 | 2/2007 |
| WO | WO 2011/107652 | 9/2011 |

\* cited by examiner

| Positioning Fix rate | Battery Life (hours) |
|---|---|
| Continuous(1/sec) | 7.7 |
| 1/30 second | 64 |
| 1/60 second | 93 |
| 1/hour | 171 |

FIG.11

METHOD AND APPARATUS FOR PROVIDING AN ALERT ON A USER EQUIPMENT ENTERING AN ALERTING AREA

PRIORITY

This application claims priority under 35 U.S.C. §119(a) to an Indian Provisional patent application filed in the Indian Intellectual Property Office on Nov. 18, 2011 and assigned Serial No. 3968/CHE/2011, and to a Korean patent application filed in the Korean Intellectual Property Office on Aug. 24, 2012 and assigned Serial No. 10-2012-0093236, the entire disclosure of each of which is hereby incorporated by reference.

BACKGROUND OF THE INVENTION

1. Field of the Invention

The present invention generally relates to portable communication devices, and more particularly, to providing an alert on the portable communication device entering an alerting area.

2. Description of the Related Art

Cellular networks can be used to detect the geographic location of a device. The geographic location can be estimated by different modes such as a handset based mode, network based mode, hybrid positioning mode, etc.

Network based geographic positioning systems use cellular base stations to estimate the location of the device, whereas in network assisted systems, the device estimates the location coordinates with the help of incorporated software and/or hardware applications. Further, in hybrid positioning systems, the network and the handset work together to first measure and then calculate the device's position where the device measures the data needed for location calculation and then the network calculates the geographic location. Several communication devices offer geographical positioning functionality using Global Positioning System (GPS), Assisted Global Positioning System (AGPS), Time Difference Of Arrival (TDOA), or the like.

The most basic positioning technology available for cellular systems is called cell-ID (cell identification). The communication device is associated with an individual base transceiver in a cell where every cell has a unique ID. The base transceiver recognizes the cell identity and geographic location. Further, the cell identity is also known to the communicating device, which can obtain the cell's position from the network. The accuracy of cell-ID depends solely on the dimensions and density of the cell.

GPS consists of multiple satellites which send signals containing the time stamp of sending, the orbital information and the almanac (positions of all satellites). GPS provides location and time information to the communication device, where there is an unobstructed line of sight to four or more GPS satellites. The GPS service provided to the communication device is independent of the network provider(s). The signals transmitted by GPS satellites are received by a GPS receiver in the communication device which utilizes this information to determine exact location coordinates of the device or user. A disadvantage of GPS is that it is inefficient to determine indoor positioning and further, in urban areas, the Time To First Fix (TTFF) sometimes takes a very long time because buildings hinder GPS signals from being received.

Applications on the devices can be used to create alerts which are generated when the user approaches or reaches a specific point of interest. The user initiates geographic positioning functionality by setting predefined conditions and a radius bounding the target location for presenting information on the user's communication device when the user approaches the target location. Once activated, the system continuously monitors the current location of the user's communication device through GPS, AGPS, or the like. Further, when the user reaches the proximity of the alerting area, the user is alerted using a suitable means. The user can be alerted by any means such as message, alarm, vibration, or the like.

Present day systems perform a location check of the communication device at regular intervals when the communication device is moving. The positioning is conducted relatively often, usually multiple times a minute in order to get an accurate location. Typically, position of the communication device is determined by its location calculated by the signals transmitted by satellites of the positioning system such as GPS or the like. Further, some technologies conduct positioning by means of a base station of a mobile communication network or wireless local area network (WLAN). The mobile communication network performs the positioning of the communication device and transmits information thereon to the device.

Portable communication devices typically have a limited source of power. Continuous positioning computation consumes a huge amount of power and causes increased current drain from the device battery. Increase in the power consumption of the device can restrict operating time and availability of positioning of the device. Further, portable communication devices may not have access to all satellites that are available at the mobile device location because of blocking by surrounding structures, particularly in urban and indoor environments. Since the GPS function will not be operating all of the time in order to maintain handset battery charge time, time to first fix on actuating the location function can be inordinately long for many Location Based Services (LBS) applications.

SUMMARY OF THE INVENTION

Accordingly, the present invention is designed to address at least the problems and/or disadvantages described above, and to provide at least the advantages described below.

An aspect of the embodiments of the present invention is to provide a method to obtain the location information for providing an alert on a user equipment (UE) entering an alerting area in an energy efficient manner.

Another aspect of the present invention is to provide a method of using different positioning methods based on the distance of the UE from altering area and on the speed of the UE.

According to an aspect of the present invention, there is provided a method for providing an alert on a UE entering an alerting area. The method includes calculating a distance between location of the UE and the alerting area, calculating position of the UE using an alternate positioning method, if the calculated distance is greater than or equal to a predetermined distance threshold, and calculating position of the UE using a satellite based communication method, if the calculated distance is less than the distance threshold.

According to another aspect of the present invention, there is provided an apparatus for providing an alert on a UE entering an alerting area. The apparatus includes a calculator to calculate a distance between location of the UE and the alerting area, and an algorithm selection unit to calculate position of the UE using an alternate positioning method, if the calculated distance is greater than or equal to a predetermined distance threshold, and calculate position of the UE using a satellite based communication method, if the calculated distance is less than the distance threshold.

BRIEF DESCRIPTION OF THE DRAWINGS

The above and other aspects, features and advantages of the present disclosure will be more apparent from the following detailed description taken in conjunction with the accompanying drawings, in which:

FIG. 11 is a table illustrating a simulation result for the average battery consumption against the various periodic rates of GPS positioning, according to an embodiment of the present invention.

DETAILED DESCRIPTION OF EMBODIMENTS OF THE PRESENT INVENTION

Figure 1:
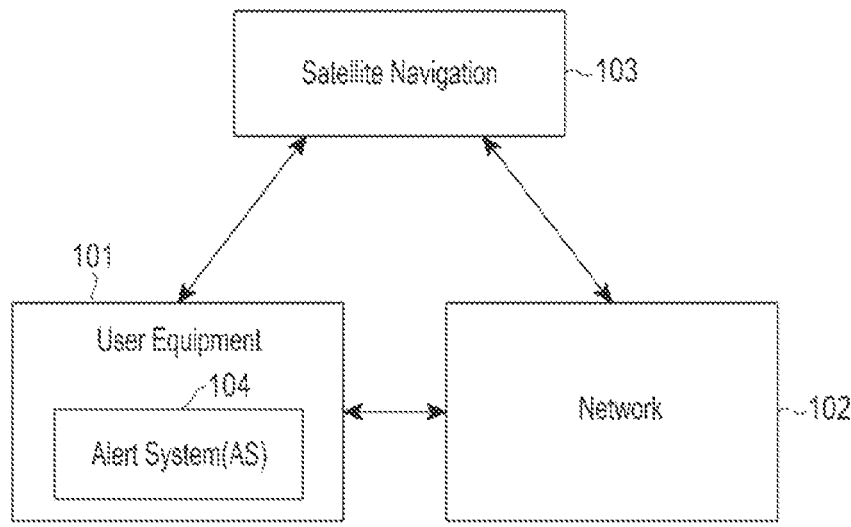
FIG. 1 is a block diagram illustrating geographical location identification system, according to an embodiment of the present invention.

Hereinafter, embodiments of the present invention will be described with reference to the accompanying drawings. Further, specific matters found in the following description are provided only to help general understanding of the present invention so that those skilled in the art will appreciate that various modifications, additions, and substitutions are possible, without departing from the scope and spirit of the invention as disclosed in the accompanying claims.

The embodiments herein achieve a system and method for energy efficient implementation of an alert system in portable communication devices. Referring now to the drawings, and more particularly to FIGS. 1 through 11, where similar reference characters denote corresponding features consistently throughout the figures, there are shown embodiments of the present invention. Throughout the specification, the word user and user equipment (UE) have been used interchangeably. The UE can be any electronic communication device enabled with an alert system.

FIG. 1 is a block diagram illustrating geographical location identification system, according to the present invention. A user 101 can set an alert such as a reminder through user equipment (UE) 101. The UE 101 comprises alert system (AS) 104 which interacts with location-based services (LBS). The UE 101 interacts with the wireless network 102 using a suitable means. The network 102 provides various information such as cell ID, location based functions, and so on. Further, the UE 101 estimates its geographical location using an alternate positioning method wherein the alternate positioning method uses information received from the network 102. The alternate positioning method may be a method such as a cell-ID based positioning system, Wi-Fi position system, control plane methods like Observed Time Difference of Arrival (OTDA) or Enhanced Observed Time Difference (E-OTD) positioning system, and so on. The user 101 can determine location based functions from LBS such as a reminder by means of user interface in the UE 101. The reminder could be provided to user 101 in the form of a text message, a sound message, vibration of the UE 101, and any other similar kind of function. Further, the UE 101 and the wireless network 102 can interact with satellite navigation (sat nav) or global navigation satellite system (GNSS) 103. The sat nay 103, such as Global Positioning System (GPS), Assisted GPS (A-GPS), Global Navigation Satellite System (GLONASS) or Galileo positioning system, enables the UE 101 to estimate its geographical location. When the user 101 arrives in a predetermined alerting area estimated by coordinates and a radius of the alerting area, a predetermined function can be executed. For example, a user 101 starting from a location X can predetermine location Y to be an alerting area to send a text message to his/her friend. When the user 101 approaches the predetermined alerting area radius, wherein the radius is set by the user, geographical location coordinate of the user 101 is estimated. If the user 101 is in the alerting area radius then the user 101 is alerted and a text message is sent to his/her friend. The reminders are activated once the geographical location of the UE 101 satisfies the coordinate information of alerting area, as per the alert set by the user 101.

In another embodiment, the UE 101 comprises an AS 104 which interacts with LBS. The LBS may be an information or entertainment service which may be accessible with mobile devices through the network 102 and utilizes the ability to make use of the geographical position of the mobile device. The LBS may be used to identify a location of a person or object, such as discovering the nearest banking cash machine or the whereabouts of a friend or employee, recommending social events in a city, turn by turn navigation to any address or like. When the UE 101 approaches a location, the LBS of the location alerts the UE 101 by sending a message or other means with information which may interest the user.

Figure 2:
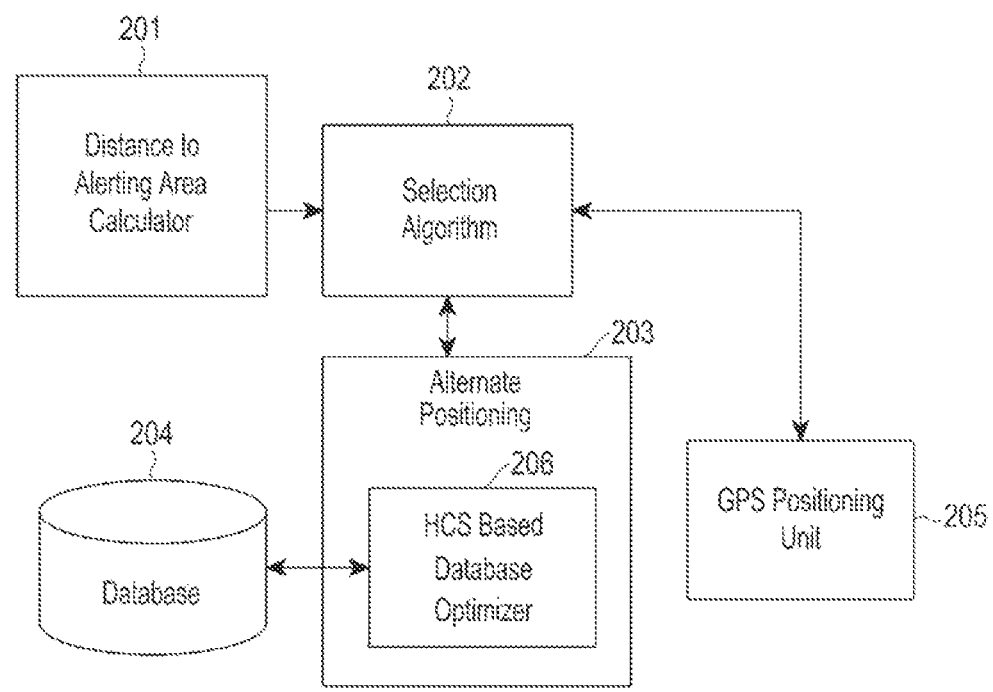
FIG. 2 is a block diagram illustrating architecture of alerting system (AS), according to an embodiment of the present invention.

FIG. 2 is a block diagram illustrating the architecture of an AS, according to an embodiment of the present invention. The UE 101 includes AS 104, and AS 104 includes algorithm selection unit 202. The algorithm selection unit 202 interacts with distance to alerting area calculator unit 201. The calculator 201 calculates the distance between the current location of user 101 and the alerting area, and passes the value to the algorithm selection unit 202. The algorithm selection unit 202 analyzes the calculated value and determines which algorithm to execute in order to estimate the geographical location of the user 101. Further, the algorithm selection unit 202 interacts with a GPS positioning unit 205 and an alternate positioning unit 203. The GPS positioning unit 205 comprises an algorithm to estimate the geographical location of the user 101 with the help of GPS satellites 103 whereas the alternate positioning unit 203 comprises an algorithm to estimate the geographical location of user 101 by identifying the cell-ID of the cell to which the UE 101 is connected. The alternate positioning unit 203 interfaces with a database 204, which stores information about the cell-ID against their respective positions. Further, the alternate positioning unit 203 comprises database optimizer unit 206 which interacts with the database 204. The database optimizer 206 optimizes the value of cell-ID with their respective positions using Hierarchical Cell Structure (HCS). The HCS can be used to split the cells in the mobile communication system which allows effective use of the geographical area by serving a large number of users. HCS allows the network to minimize the frequent cell reselections and handovers by letting mobile devices camp on various types of cells according to their mobility state.

Figure 3:
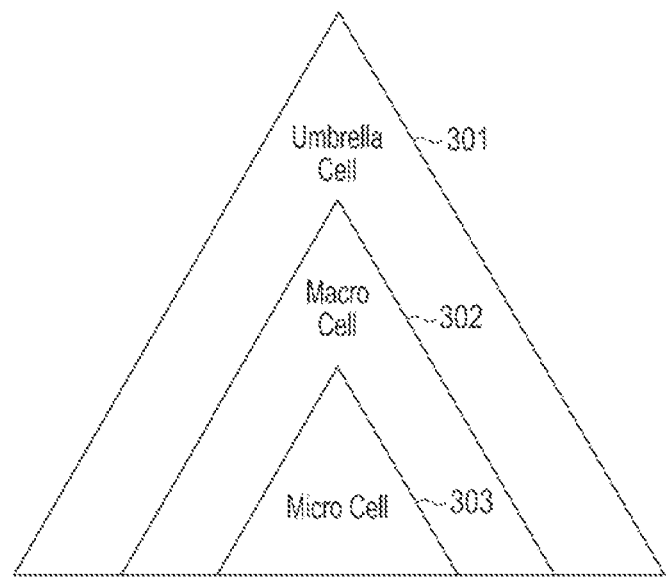
FIG. 3 is a diagram illustrating a Hierarchical Cell Structure (HCS) cell present in a cellular network, according to an embodiment of the present invention.

FIG. 3 is a diagram illustrating the HCS cell structuring present in the cellular network, according to an embodiment of the present invention. A large cell referred to as an umbrella cell 301 can coexist with smaller cells called macro cells 302. The macro cell 302 can further coexist with smaller cells called micro cells 303 and pico cells. For example, a cricket stadium/exhibition ground can be a micro cell 303 and a multi-storied building can be a pico cell within the large cell. The cells in the FIG. 3 are illustrated in triangular shape. In an embodiment of the present invention, the boundary of the Alerting Area can be pre-determined by user input of the proximity area. If the proximity area is not in a shape of a circle, then the largest circle covering the proximity area is considered as the Alerting Area. The micro/pico cell is allocated the radio spectrum to serve the increased population. UEs 101 going out of the pico/micro cells can be allowed to reselect a larger cell. Further, in HCS, cells can be given priorities from 0-7 where 0 is the lowest priority and 7 is the highest. The smaller cells are given highest priority and larger cells are given lower priority. In low mobility conditions, UE 101 would prioritize on higher priority cells (smaller cells). However, in high mobility, UEs prioritize to reselect to the lower priority cells to avoid frequent reselections. In another embodiment, the umbrella cells 301 can be given priority over macro cells 302, micro cells 303, and pico cells in order to avoid frequent cell transitions of the UE 101. Frequent cell transition can consume a lot of battery power of the UE 101.

Figure 4:
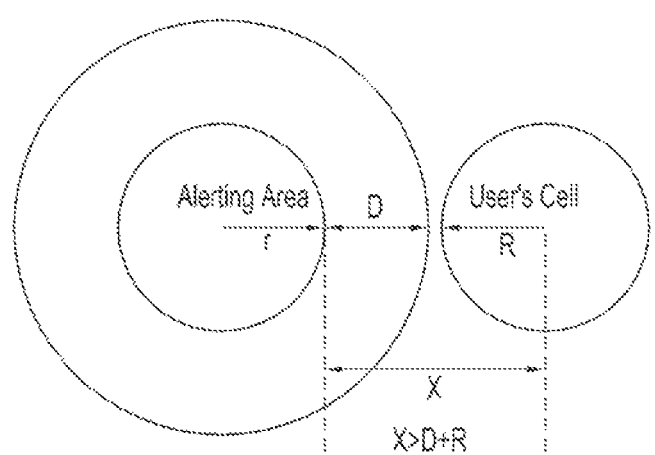
FIG. 4 is a diagram illustrating the criteria for an alternate positioning method, according to an embodiment of the present invention.

FIG. 4 is a diagram illustrating the criteria for an alternate positioning method, according to the present invention. In an embodiment of the present invention, geographical location of UE 101 can be estimated by an alternate positioning method. The alternate positioning method can be used when the UE 101 is considerably far away from the alerting area. The UE 101 can be camped on to the cell whose maximum radius is R. Further, the alerting area is D, the first threshold distance from the UE 101, which is employed by the selection algorithm. The threshold distance D used in the algorithm is predetermined based on the practical knowledge of the network or by conducting experiments. If the distance of the UE 101 from the alerting area is at least 2R+D, the second threshold distance, then the alternate positioning method can be deployed.

In another embodiment, the alternate positioning method can be the cell-ID positioning system. The cell-ID positioning system, such as a Secure User Plane Location (SUPL) protocol based cell-ID positioning system, a cell-ID in control plane based positioning system, or an enhanced cell-ID, can be deployed to estimate the geographical position of the UE 101 effectively. Further, SUPL architecture includes a SUPL Enabled Terminal (SET) and a SUPL Location Platform (SLP). The SET is a mobile device, such as a phone or PDA, which can be configured to support SUPL transactions. The SLP is a server or network equipment stack that handles tasks associated with user authentication, location requests, location-based application downloads, charging, and roaming. Further, SUPL supports C-Plane protocols developed for the exchange of location data between a mobile device and a wireless network.

Figure 5:
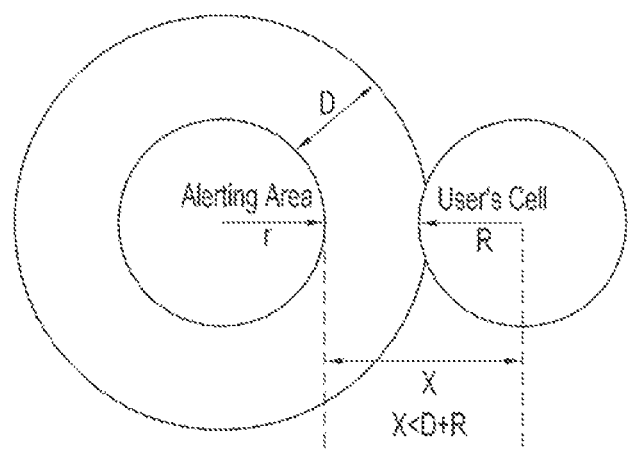
FIG. 5 is a diagram illustrating the criteria for a GPS positioning method, according to an embodiment of the present invention.

FIG. 5 is a diagram illustrating the criteria for the GPS positioning method, according to an embodiment of the present invention. The geographical location of a UE 101 can be estimated by a GPS positioning method. The GPS positioning method can be used when the UE 101 is considerably near to the alerting area. The UE 101 can be camped on to the cell whose maximum radius is R. Further, the alerting area D is the first threshold distance away from the UE 101. If the distance of the UE 101 from the alerting area is less than R+D, the third threshold distance, then the GPS positioning method can be deployed.

Figure 6:
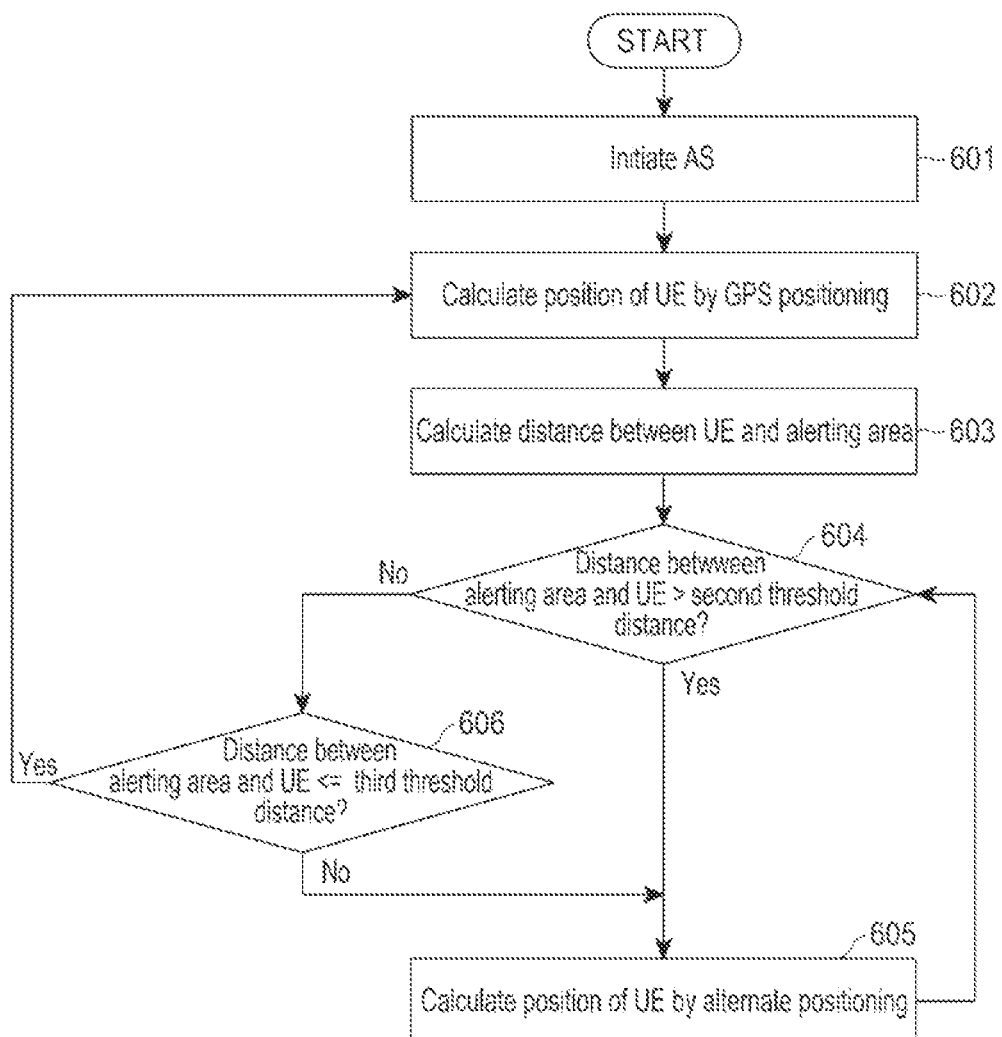
FIG. 6 is a flow chart which depicts selecting a positioning method in the alert system, according to an embodiment of the present invention.

FIG. 6 is a flow chart which depicts selecting a positioning method in the alert system, according to an embodiment of the present invention. A user initiates the alert system in step 601 on his/her UE 101 by providing information about an alert area. The default method used by the UE 101 for the alert is GPS positioning. The GPS positioning method estimates the geographical location coordinate of the user 101 in step 602. The GPS tracking mode calculates the distance between the UE 101 and the alerting area in step 603. The distance between the alerting area and the UE 101 is checked against second threshold distance 2R+D identified by experimentation. If the distance between the alerting area and the UE 101 is more than the second threshold distance 2R+D then in step 605 the system switches to an alternate positioning method. However, if the distance between the alerting area and the UE 101 is less than or equal to the third threshold distance R+D in step 606, the GPS positioning method is used. The GPS positioning system is repeated until the UE 101 reaches the destination or switches to the alternative positioning method where the threshold distance is R+D or the alert system is stopped/halted by the user.

The various actions in the method can be performed in the order presented, in a different order or simultaneously. Further, in some embodiments, some actions listed in FIG. 6 can be omitted. The alternate positioning method such as Cell-ID which is an event based mechanism can be employed when the user 101 may be far from the alerting area. The UE 101 can be camped on to a cell. The coverage area of cell can be large; therefore the UE 101 can remain in a dormant state until an event occurs such as cell reselection or some special event such as switching to an emergency service, receiving no service or like.

Figure 7:
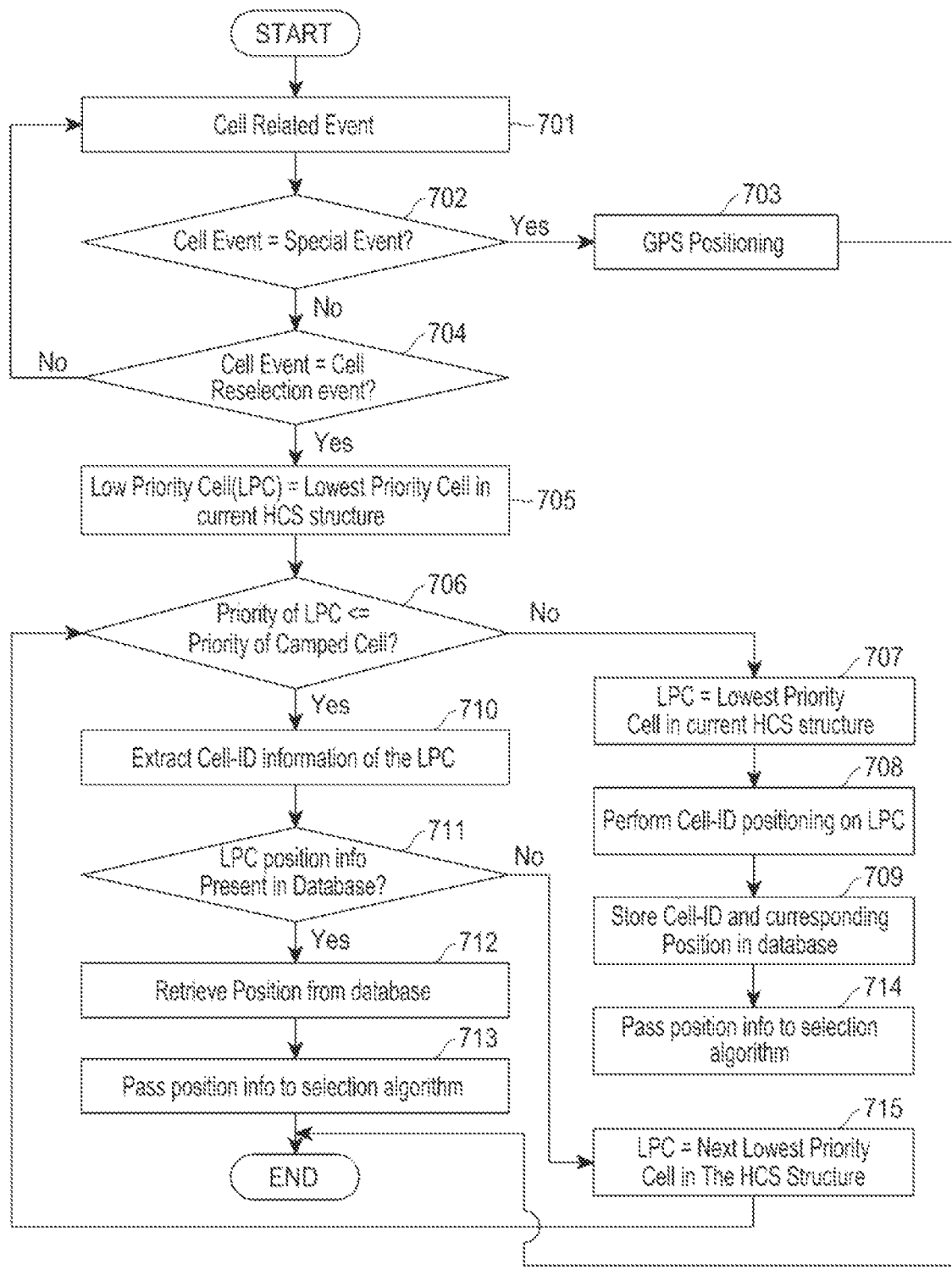
FIG. 7 is a flow chart which depicts accessing and maintaining a database for an alternate positioning method in the alert system, according to an embodiment of the present invention.

FIG. 7 is a flow chart which depicts accessing and maintaining a database for the alternate positioning method in the alert system, according to an embodiment of the present invention. An alert can be optimized by maintaining a database 204 in the alternate positioning method. Cell related events are observed in step 701. The cell event is checked in step 702 to see if the occurred events are special events, such as servicing switching, emergency service or no service. If the cell events are special events, then the GPS positioning method is activated in step 703 to estimate the geographical location coordinates. However, if the cell event is not a special event, then the cell event is checked in step 704 to see if any cell reselection event has occurred. However, if no cell event has occurred, then the system waits until any cell related event occurs. If cell reselection event has occurred, then the lowest priority cell in the current HCS structure is assigned in step 705 to a variable low priority cell (LPC).

However, if the cell event is not a cell reselection event, then the priority of a low priority cell (LPC) is checked in step 706 against the priority of the cell on to which the UE 101 is camped. Further, after determining the low priority cell (LPC), the cell-ID camped is checked in step 706 against the lower priority/higher rank cell. If the priority of the low priority call (LPC) is less than or equal to the priority of the camped cell, then the cell-ID information about the low priority cell is extracted or obtained in step 710. Further, the information about the low priority cell is then checked in step 711 in the database 204. If the information about the low priority cell is present in the database 204, then the corresponding geographical position can be retrieved in step 712 and provided to the selection algorithm in step 713.

If the information about the low priority cell is not present in the database 204 in step 711, then the next lowest priority cell in the HCS structure is set in step 715 as the low priority cell. Further, in step 706, if the priority of the low priority cell is greater than the priority of the camped cell, then the lowest priority cell in the current HCS structure is set in step 707 as the low priority cell (LPC). Further, cell-ID positioning on the LPC is performed in step 708 with the lowest priority cell in the current HCS structure, and the cell-ID information is stored in the database 204 in step 709. Further, the position information is passed to the selection algorithm in step 714. The algorithm finds the cell-ID position of the UE 101 either through database 204 or cell-ID positioning along with the cell rank and provides the information to the selection algorithm which enables the algorithm to determine the value of R, where R is the radius of the largest cell size for the specific cell. Further, the alternate positioning method maintains the database 204 by giving priority to the umbrella cells 301. The various actions in the method can be performed in the order presented, in a different order or simultaneously. Further, in some embodiments, some actions listed in FIG. 7 can be omitted.

The database 204 maintains the value of the cell-ID versus position information in order to prevent the UE 101 from performing positioning wherein the UE 101 traces the same path followed by the UE 101 earlier. When the UE 101 visits the same cell again, then the database 204 is then just referred to instead of performing the positioning method again.

The database 204 maintains a table of the cell-ID versus the location corresponding to that cell along with the priority of the cell in the HCS structure. The information can be obtained during any prior alert sessions and the database 204 is updated dynamically for future access. When the position of a cell-ID from the network 102 is estimated, the alert system 104 identifies the cell-ID of the lower priority cell in the HCS structure which can help in reducing the database 204 size and the number of computations performed by the UE 101 to estimate the geographical position. Further, the database 204 can be updated dynamically by giving priority to the lower priority cells in the HCS structure, which can help in reducing the size of the database 204. The database 204 can be updated when the cell-ID positioning is used by any other location based application. Further, reduction in computation by the UE 101 can reduce power consumption of the battery in UE 101.

In an embodiment of the present invention, a lower priority cell can be used as a reference when the radius of the cell onto which the UE 101 is camped is larger. The cell-ID positioning method is initiated once the UE 101 moves out of the cell. Further, usage of the lower priority cell as a reference can reduce power consumption of the battery in UE 101.

In another embodiment of the present invention, the alert can be optimized by employing a variable periodicity rate depending upon the speed of the UE 101 and the distance of the UE 101 from the Alerting Area in the GPS positioning method, such as a tracking mode. The tracking mode refers to the mode in which the GPS positioning unit 205 responds with the current position of the UE 101 after every predefined time interval. The predefined time interval can be provided by the UE 101 and the time interval can be changed by the UE 101 at any moment of time.

Figure 8:
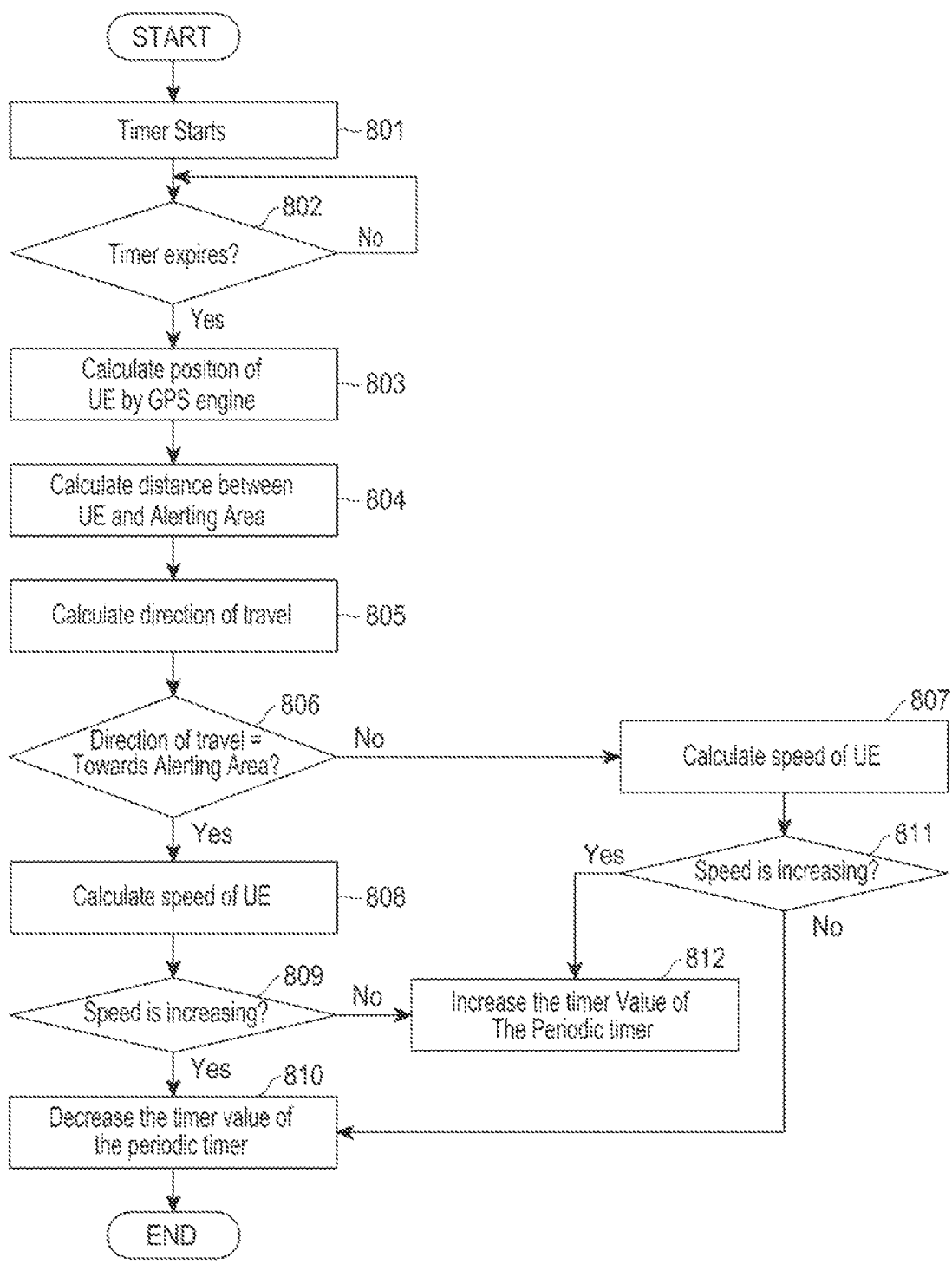
FIG. 8 is a flow chart which depicts altering the periodicity of the timer for the GPS positioning method in the alert system, according to an embodiment of the present invention.

FIG. 8 is a flow chart which depicts altering the periodicity of the timer for the GPS positioning method in the alert system, according to an embodiment of the present invention. The GPS tracking mode can be used regardless of the position information of the UE 101 from the alerting area. A dynamic timer is used in the GPS tracking mode to estimate the geographical location of the UE 101. The timer is activated in step 801 to estimate the geographical location at regular intervals. When the timer expires in step 802, the co-ordinates of the geographical position of the UE 101 are calculated in step 803 by GPS positioning unit 205. Further, the GPS positioning unit 205 calculates the distance between the UE 101 and the alerting area in step 804 and the direction of travel of UE 101 in step 805. The direction of travel is checked in step 806. If the direction of travel is towards the alerting area, then the speed of travel of the UE 101 is calculated in step 808. Further, the speed of the UE's 101 travel is checked in step 809. If the speed of the UE's 101 travel is increasing, then the timer value of the periodic timer is reduced in step 810. However, if the speed of the UE's 101 travel is decreasing, then the timer value of the periodic timer is increased in step 812.

Further, in step 806, if the UE 101 is traveling away from the alerting area, then the speed of the UE's 101 travel is calculated in step 807, and then checked in step 811. If the speed of the UE's 101 travel is increasing, then the timer value of the periodic timer is increased in step 812. However, in step 811, if the speed of the UE's 101 travel is decreasing, then the timer value of the periodic timer is decreased in step 810. The process decides the new value of the periodic timer which regulates time fixes of the GPS positioning. The various actions in the method can be performed in the order presented, in a different order or simultaneously. Further, in some embodiments, some actions listed in FIG. 8 can be omitted.

The periodicity or control of the time interval of the fixes can be maintained to optimize the alert system 104. Depending on the distance of the UE 101 from the alerting area and the speed of the UE's 101 travel, the periodicity of obtaining the position fix using GPS can be decreased or increased. Hence, increased period time will result in less frequent fixes which can consume less battery power of the UE 101.

In another embodiment, the alert can be optimized by using the alternate (Cell-ID) positioning method and the GPS positioning method interchangeably based on the distance of the UE 101 from the alerting area with a threshold. The alternate positioning can provide an approximate cell center in which the UE 101 is camped and when the UE 101 is considerably far away from the alerting area. The alternate positioning activates when an event occurs such as when the UE 101 changes cells. The GPS positioning method can be performed when the user 101 requires more accurate positioning method. Further, the GPS positioning activates when the timer value of a periodic timer expires.

The threshold distance D considered can be predetermined based on the practical knowledge of the network 102 such as a maximum radius of an umbrella cell, macro cell or micro cells observed in a real time network 102, cell reselection delays and experimental data such as a minimum area around the alerting area in which GPS positioning can be started irrespective of the size of the alerting area considering the maximum practical speed achievable by UE 101.

In an embodiment of the present invention, the GPS positioning can be shifted to the alternate positioning method. When a user 101 moves away from the alerting area, the alternate positioning method can be employed. The alternate positioning is used only when the center of the cell is known on to which the UE 101 is camped on. Further, the UE 101 is at least at a distance of R+D from the alerting area. As GPS positioning can estimate the exact position of the UE 101, the maximum distance the UE 101 can be is at a diametrically opposite point in a circle to the alerting area whose center is exactly at a distance of R+D from the alerting area. Hence, when the UE 101 is at a defined distance from the alerting area, the alternate positioning method is used to get the geographical position of the UE 101 wherein the defined distance is the second threshold 2R+D, where D is the pre-defined minimum distance beyond which alternate positioning might fail in alerting when UE 101 enters the alerting area, and R is the maximum radius of the cell (based on its priority) on to which the UE is currently camped on.

After performing the first fix, the UE 101 calculates its distance from the alerting area and based on the distance, a decision is made for which method is to be processed.

Figure 9:
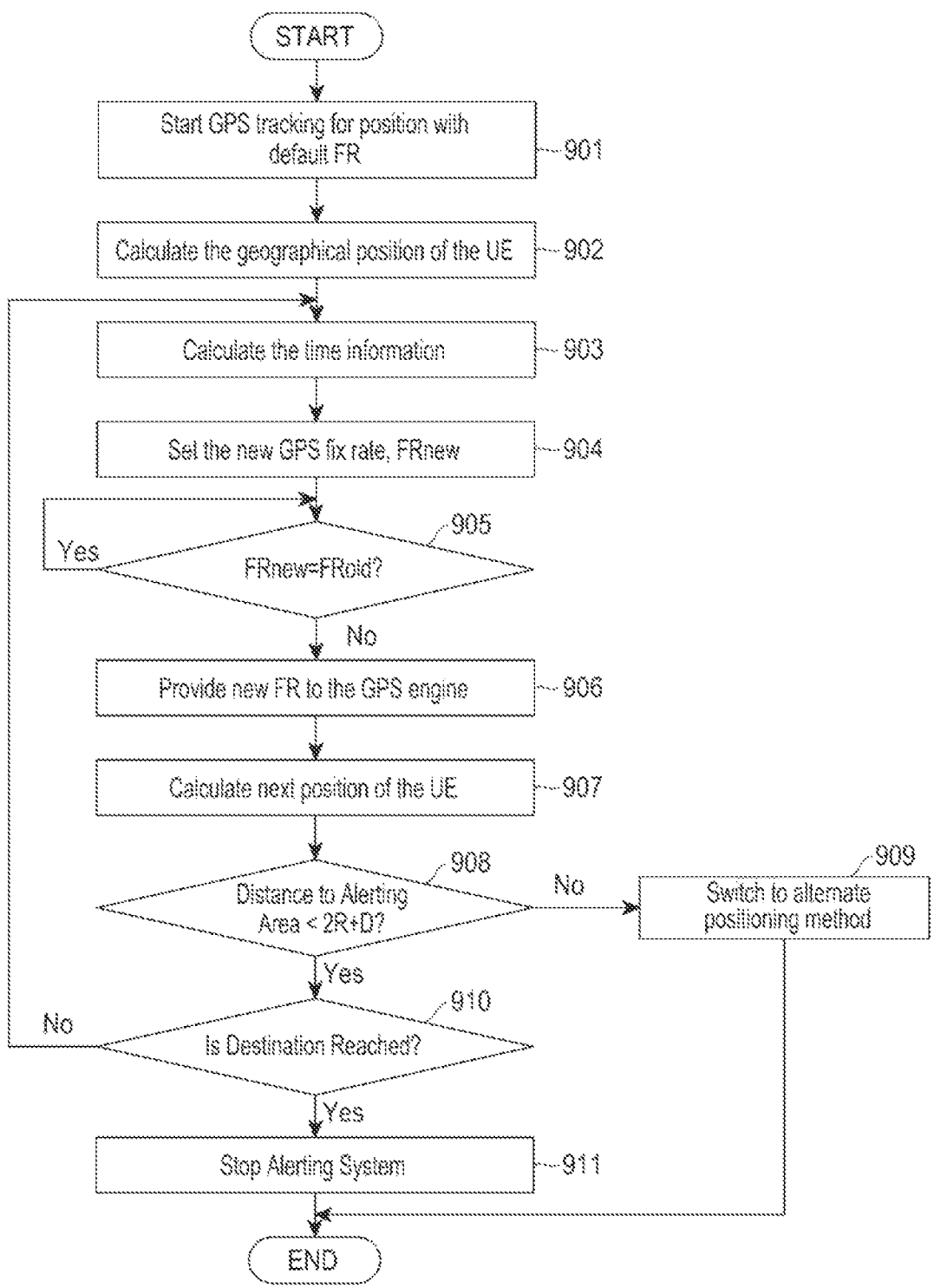
FIG. 9 is a flow chart which depicts shifting from GPS positioning to alternate positioning, according to an embodiment of the present invention.

FIG. 9 is a flow chart which depicts shifting from GPS positioning to alternate positioning, according to an embodiment of the present invention. The default method used by the UE 101 for an alert is GPS positioning. The GPS tracking is activated in step 901 with a default fix rate (FR) to calculate the geographical location coordinates of the UE 101 in step 902. After receiving the fix, the time required by the UE 101 to reach the alerting area is calculated in step 903 by the distance between the UE 101 and the alerting area and the speed of the UE 101. The fix rate of the GPS tracking can be changed in step 904 to FRnew based on the calculated time required by the UE 101 to reach the alerting area and the distance between the UE 101 and the alerting area. The fix rate is calculated using a predefined formula. Further, the new calculated fix rate FRnew value is compared with the default/old fix rate FRold value in step 905. If the FRnew calculated is not equal to the FRold then the FRnew is passed to the GPS positioning unit 205 to get the next or new fix in step 906. The position of the UE 101 is retrieved to determine the distance of the UE 101 from the alerting area. Further, the cell information of the cell on to which the UE 101 is camped is calculated in step 907. The distance between the UE 101 and the alerting area is then checked in step 908. If the distance is greater than the second threshold value 2R+D, then the GPS tracking system is terminated and the system switches in step 909 to the alternate positioning method.

The alternate positioning method is preferred as the UE 101 moves far away from the alerting area. However, in step 908, if the distance is less than the second threshold value 2R+D, then a check is performed at step 910 to identify user's destination. Once the UE 101 reaches the destination, the system stops the alert at step 911. However, if the destination is not reached, then the process returns to step 903 to again calculate the time to reach the alerting area by the UE 101 and the distance between the UE 101 and the alerting area. The steps 903, 904, 905, 906, 907, 908, 910 and/or 909 are repeated until the UE 101 reaches the destination or switches to the alternative positioning method. The various actions in the method can be performed in the order presented, in a different order or simultaneously. Further, in some embodiments, some actions listed in FIG. 9 can be omitted.

In another embodiment of the present invention, the alternate positioning can be shifted to the GPS positioning method. When the UE 101 moves towards the alerting area, the cell-ID positioning is unable to provide high accuracy for the nearby alerting area. Hence, when the UE 101 is within a defined distance of the alerting area, the GPS positioning method can be used to get the exact position of the UE 101 wherein the defined distance is a third threshold R+D, where D is the pre-defined minimum distance beyond which alternate positioning might fail in alerting when UE 101 enters the alerting area, and R is the maximum radius of the cell (based on its priority) for which the cell-ID positions are calculated.

When the distance between the UE 101 and alerting area is more than R+D, then alternate positioning can be used.

Figure 10:
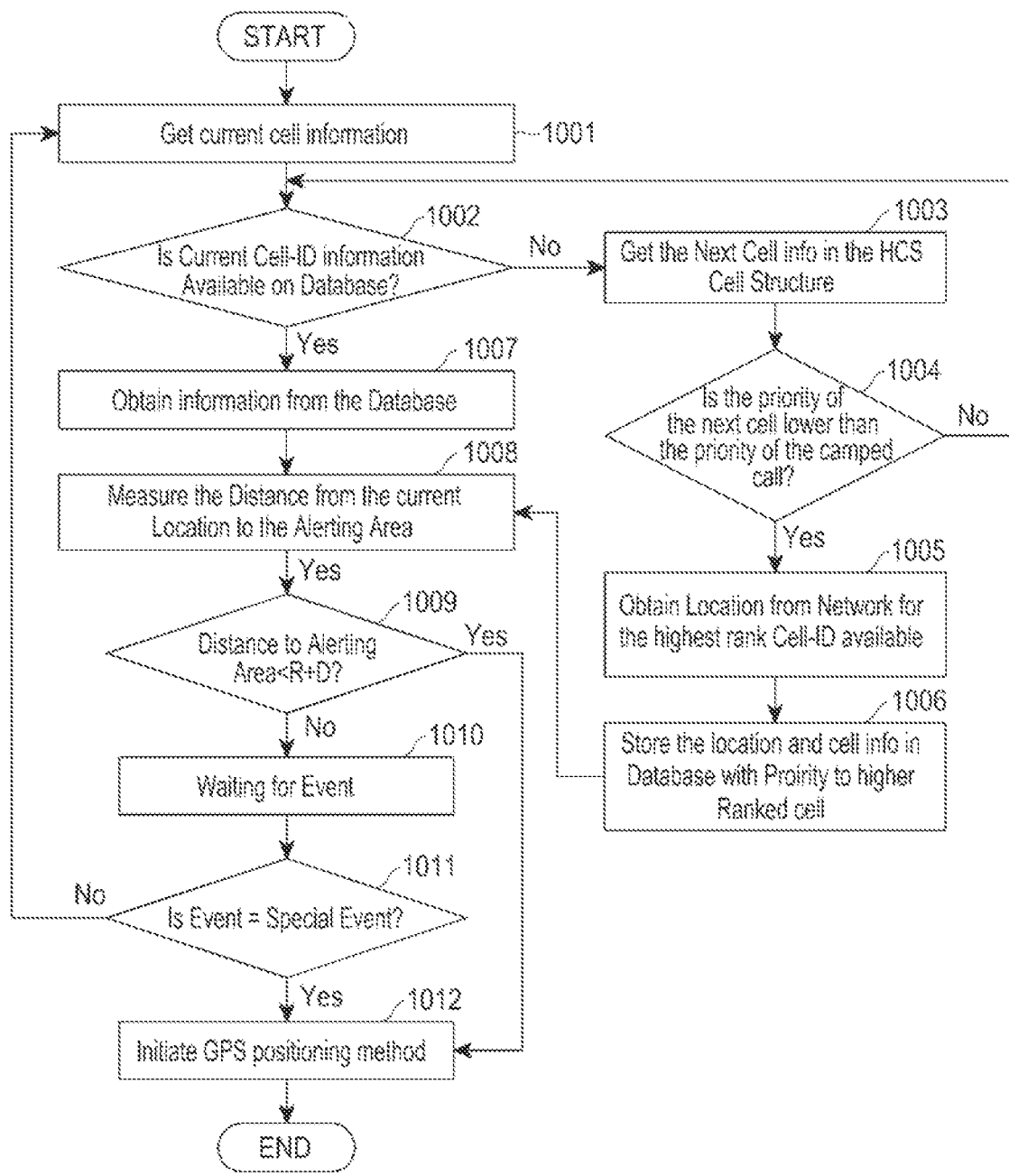
FIG. 10 is a flow chart which depicts shifting from alternate positioning to GPS positioning, according to an embodiment of the present invention.

FIG. 10 is a flow chart which depicts shifting from alternate positioning to GPS positioning, according to an embodiment of the present invention. The information about the cell on to which the UE 101 is camped is obtained in step 1001. The database 204 is checked in step 1002 if the obtained cell information is present where the database optimizer 206 can optimize the value of the cell-ID with their respective positions by Hierarchical Cell Structure (HCS). If the obtained/current cell information is not present in the database 204 then the cell-ID information of the next bigger cell or cell with lower priority in the HCS structure can be retrieved in step 1003. The priority of the currently retrieved cell is then checked in step 1004 against the priority of the camped cell. If the priority of the currently retrieved cell is lower than the priority of the camped cell, then cell-ID positioning is performed in step 1005 to obtain the geographical location for the highest rank cell-ID with respect to the lowest priority cell of the current HCS structure. The obtained geographical location and the current cell information can be stored in step 1006 in the database 204 with priority to higher ranked cell. Further, the distance between the current location of the UE 101 and the alerting area is calculated in step 1008. However, if the priority of the currently retrieved cell is higher than the priority of the camped cell in step 1004, then the database 204 is checked in step 1002 if the current cell-ID information on to which the UE 101 is camped is present.

Further, in step 1002, if the obtained/current cell information is present in the database 204, then the information about current cell is retrieved in step 1007 from the database 204. The distance between the current location of the UE 101 and the alerting area is calculated in step 1008. The calculated distance is then checked in step 1009 against the third threshold value R+D. If the calculated distance is less than the third threshold value then the method terminates the alternative positioning method in step 1012. Further, it can be inferred that the UE 101 is inside the threshold distance from the alerting area, and therefore the system switches to the GPS positioning system in step 1012. However, if the calculated distance is greater than the third threshold value in step 1009, then the system waits in step 1010 for an event to occur. The event can be a regular event such as cell reselection or special events such as service switching, emergency service, no service, etc. Further, it is noted that cell-ID positioning cannot be followed in special events. If the event occurred is a special event in step 1011, then the system terminates the alternative positioning method and switches to GPS positioning in step 1012, otherwise the system returns to step 1001 and repeats the process of cell-ID positioning. The process is repeated until the UE 101 aborts the system or the UE 101 enters the proximity area of the alerting area.

The various actions in the method can be performed in the order presented, in a different order or simultaneously. Further, in some embodiments, some actions listed in FIG. 10 can be omitted.

The alternate positioning method can consume less battery power compared to GPS positioning method and hence, can optimize the alert process.

The event based positioning is utilized less frequently on network 102 compared to the time based positioning. Further, the current consumption of cell-ID positioning is around 3-4 mA as compared against an average current consumption of 101 mA in GPS positioning, which is more than 10 times greater. Thus, alternate positioning consumes less battery power than GPS positioning.

FIG. 11 is a table depicting a simulation result for the average battery consumption against the various periodic rates of GPS positioning, according to embodiment of the present invention. The table illustrates that a high fix rate for determining the position of the UE 101 can quickly consume the UE's 101 battery power whereas a low fix rate would result in longer UE 101 battery life. In a simulation, a battery having 800 mA hours with 1.6 mA as idle current lasted for only 7.7 hours when a continuous (1/sec) positioning fix rate was set. However, the battery lasted for 171 hours when the positioning fix rate was set to 1/hour.

The embodiments disclosed herein can be implemented through at least one software program running on at least one hardware device and performing network management functions to control the network elements. The network elements shown in FIGS. 1 and 2 include blocks which can be at least one of a hardware device, or a combination of hardware device and software module.

The embodiments disclosed herein provide methods and systems to enable customization of an application to enhance user experience on a computing device by having one or more resident client entities negotiate with one or more client execution entities or a server on aspects of said application that can be customized. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device.

The method can be implemented through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device can also include means such as hardware means, for example an Application Specific Integrated Circuit (ASIC), or a combination of hardware and software means, for example an ASIC and a Field Programmable Gate Array (FPGA), or at least one microprocessor and at least one memory with software modules located therein. The method described herein could be implemented partly in hardware and partly in software. Alternatively, the invention can be implemented on different hardware devices, e.g. using a plurality of Central Processing Units (CPUs).

The foregoing description of the embodiments of the present invention reveal the general nature of the invention so that others can, by applying current knowledge, readily modify and/or adapt for various applications such specific embodiments without departing from the concept of the present invention. Such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modification within the spirit and scope of the embodiments as described herein.

What is claimed is:

1. A method for providing an alert on a user equipment (UE) entering an alerting area, the method comprising:
    calculating, by the UE, a distance between a location of the UE and the alerting area;
    calculating, by the UE, a position of the UE using a first positioning method, if the calculated distance meets a first condition, wherein the first condition is that the calculated distance is greater than or equal to a predetermined distance threshold; and
    calculating, by the UE, the position of the UE using a second positioning method, if the calculated distance meets a second condition, wherein the second condition is that the calculated distance is less than a distance threshold,
    wherein calculating the position of the UE using the second positioning method comprises calculating the location of the UE using a satellite based communication method at periodic intervals, if the calculated distance meets the second condition, and
    wherein the periodic intervals depend on at least one of speed of the UE, direction of travel of the UE with respect to the alerting area, and the distance between the location of the UE and the alerting area.

2. The method as claimed in claim 1, wherein an alerting system is activated by a user of the UE.

3. The method as claimed in claim 1, wherein the first positioning method is an alternate positioning method.

4. The method as claimed in claim 3, wherein the alternate positioning method is at least one of a cell-ID based positioning system, Wi-Fi positioning system, and Observed Time Difference of Arrival (OTDA) positioning system.

5. The method as claimed in claim 4, wherein the cell-ID based positioning system is at least one of a Secure User Plane Location (SUPL) protocol based cell-ID positioning system, cell-ID in control plane based positioning system, and enhanced cell-ID.

6. The method as claimed in claim 4, wherein the cell-ID based positioning system gives priority to umbrella cells over micro cells, macro cells and pico cells.

7. The method as claimed in claim 6, further comprising storing at least one of cell IDs, location of the cell IDs, and priority of cells corresponding to the cell IDs in a database.

8. The method as claimed in claim 1, wherein the second positioning method is a satellite based communication method.

9. The method as claimed in claim 8, wherein the satellite based communication method is at least one of Global Positioning System (GPS), and Assisted GPS (AGPS).

10. An apparatus for providing an alert on a user equipment (UE) entering an alerting area, the apparatus comprising:
    a calculator configured to calculate a distance between a location of the UE and the alerting area; and
    an algorithm selection unit configured to calculate a position of the UE using a first positioning method, if the calculated distance meets a first condition, wherein the first condition is that the calculated distance is greater than or equal to a predetermined distance threshold, and to calculate the position of the UE using a second positioning method, if the calculated distance meets a second condition, wherein the second condition is that the calculated distance is less than a distance threshold, wherein, if the calculated distance meets the second condition, the algorithm selection unit is further configured to calculate the location of the UE using a satellite based communication method at periodic intervals, and wherein the periodic intervals depend on at least one of speed of the UE, direction of travel of the UE with respect to the alerting area, and the distance between the location of the UE and the alerting area.

11. The apparatus as claimed in claim 10, wherein an alerting system is activated by a user of the UE.

12. The apparatus as claimed in claim 10, wherein the first positioning method is an alternate positioning method.

13. The apparatus as claimed in claim 12, wherein the alternate positioning method is at least one of a cell-ID based positioning system, Wi-Fi positioning system, and Observed Time Difference of Arrival (OTDA) positioning system.

14. The apparatus as claimed in claim 13, wherein the cell-ID based positioning system is at least one of a Secure User Plane Location (SUPL) protocol based cell-ID positioning system, cell-ID in control plane based positioning system, and enhanced cell-ID.

15. The apparatus as claimed in claim 13, wherein the cell-ID based positioning system gives priority to umbrella cells over micro cells, macro cells and pico cells.

16. The apparatus as claimed in claim 15, wherein the algorithm selection unit stores at least one of cell IDs, location of the cell IDs, and priority of cells corresponding to the cell IDs in a database.

17. The apparatus as claimed in claim 10, wherein the second positioning method is a satellite based communication method.

18. The apparatus as claimed in claim 17, wherein the satellite based communication method is at least one of Global Positioning System (GPS), and Assisted GPS (AGPS).

* * * * *